Nov. 4, 1947.  H. M. REEVES  2,430,079
COOKING TOP FOR GAS COOK STOVES
Filed July 14, 1943
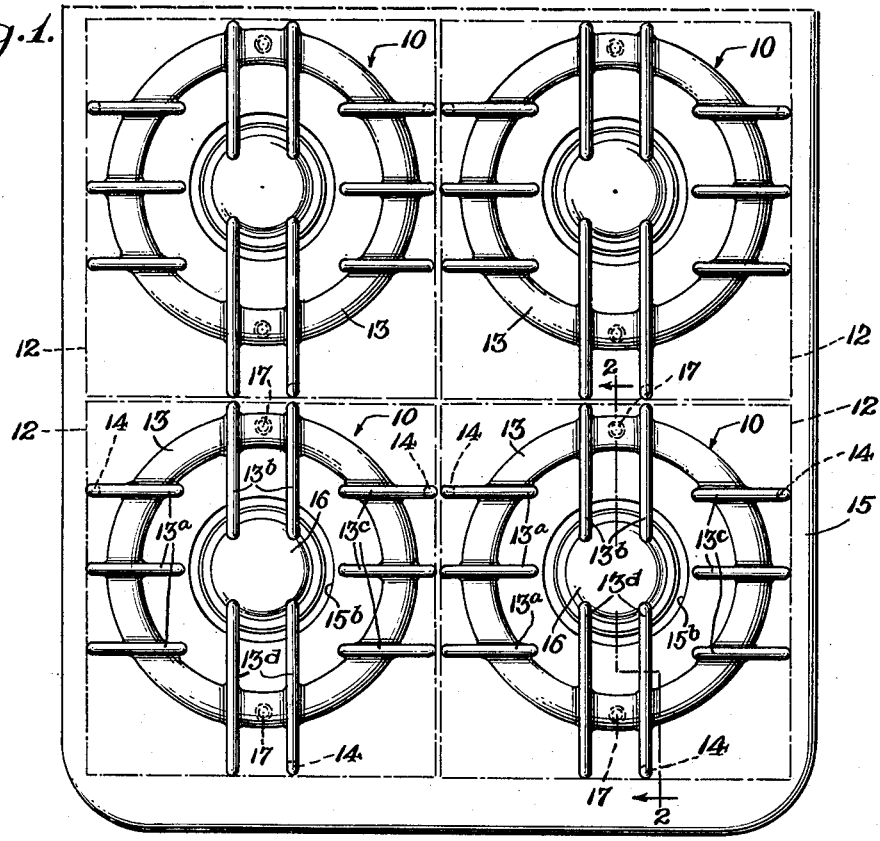
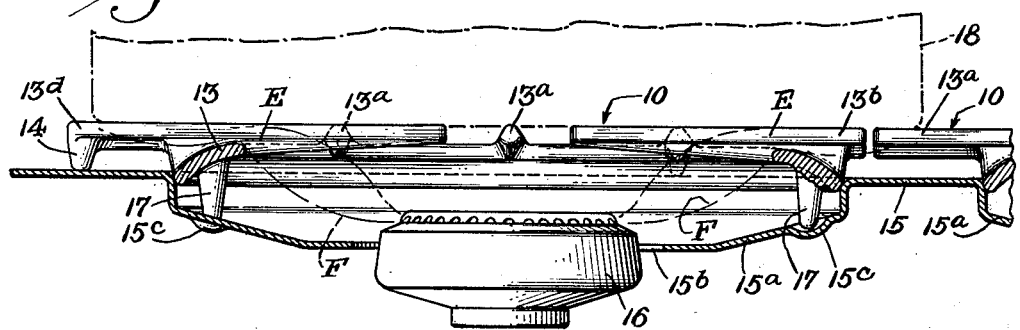
Inventor
Herbert M. Reeves
BY
Attorneys.

Patented Nov. 4, 1947

2,430,079

UNITED STATES PATENT OFFICE 2,430,079

COOKING TOP FOR GAS COOK STOVES

Herbert M. Reeves, Kankakee, Ill., assignor to Florence Stove Company, Gardner, Mass., a corporation of Massachusetts Application July 14, 1943, Serial No. 494,631

2 Claims. (Cl. 126—214)

The present invention relates to cooking tops for gas cook stoves and more especially to a novel form of grate therefor.

One object of the invention is to provide in a cooking top a grate which is of a novel form adapted, when duplicated over the tops of several burners in the cooking top, to form a substantially continuous grid over the latter with the utensil-supporting fingers in each grate forming continuations of those in the next adjacent grates.

Another object is to provide in a cooking top a grate which is adapted to effect efficient and effective confinement of the flames or gaseous products of combustion to the bottom of a supported utensil but which is constructed in a novel manner for minimized heating of the grate inself.

Still another object of the invention is to provide a cooking top embodying a novel arrangement for confining and directing the gaseous products of combustion from the burner into intimate and effective contact with a utensil while minimizing the conduction of heat to the top panel of the cooking top from a grate which supports the utensil and also confines and directs such gaseous products of combustion.

Further objects and advantages of the invention will become apparent as the following description proceeds, taken in connection with the accompanying drawing in which:

Figure 1 is a plan view of a cooking top for a gas cook stove embodying the invention and provided with four identical grates of the novel form herein contemplated.

Fig. 2 is an enlarged transverse sectional view of one of the grates and portion of the cooking top in which it is located, the grate being sectioned substantially along the line 2—2 in Fig. 1.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Referring more in detail to the drawings, four grates, designated generally by the numeral 10, are shown in Fig. 1 disposed in the layout used for the same in a four-burner cooking top, the top panel of such cooking top being designated as 15. Each of the grates shown is a structurally independent unit preferably made of cast metal and being removably seated above its associated burner 16 which is centered in a corresponding burner opening 15b in the top panel 15.

It is characteristic of the grates 10 that they are of a novel form such that when a plurality of them are in place on a cooking top they constitute a substantially continuous grid for the same. For that purpose each grate 10 comprises a plurality of utensil-supporting fingers rigidly joined together in a pattern in which the fingers are disposed to extend inward generally toward a common center with their outer ends lying at spaced points along respective sides of a rectangle and with the number and location of finger ends on each side of such rectangle duplicating those on the opposite side. In Fig. 1 the dimensions of the imaginary rectangles embracing the several grates 10 and their location relative to the burner openings are indicated by the dot-dash lines 12. By virtue of this symmetrical layout of the utensil-supporting fingers with reference to the sides of a rectangle which bounds them, it is possible to provide any desired number of such grates in adjacent relation as shown in Fig. 1, whereby the symmetrically located fingers in adjacent grates will be aligned with each other to form a substantially continuous grid over the surface of the cooking top, thus accommodating a wide variety of utensil sizes and permitting the sliding of utensils freely across the surfaces of the cooking top from one burner to another.

In the preferred construction shown, each grate 10 comprises an annular member or ring 13 having integral therewith four sets of utensil-supporting fingers designated, respectively, as 13a, 13b, 13c and 13d. These four sets of fingers are disposed at equal intervals about the ring 13 so that the center of each set is displaced substantially ninety degrees about the periphery of the ring from the next adjacent sets. The fingers in each set are parallel with each other and are thus at right angles to those in the next adjacent set. On the other hand, the fingers in diametrically opposite sets match each other in number and location, being in alignment. Thus, there are three fingers in each of the sets 13a, 13c and two fingers in each of the other opposed pair of sets 13b, 13d. The spacing between fingers in each set is approximately the same and by using a smaller number of fingers in the sets 13b and 13d, it is possible to interpose them between the ends of the other pair 13a, 13c while still extending the latter some distance within the borders of the ring 13. With such an arrangement of fingers the cooking top affords full support to a great variety of sizes of utensils ranging from a cup so small that it would rest on only the inner ends of the sets of fingers 13b, 13d, to a large vessel such as a wash boiler that would extend over the tops of two or more burners. It will be observed that the inner ends of the two pairs of fingers 13b and 13d form the corners of a small rectangle disposed centrally of the ring. Preferably the outer ends of the fingers 13b are terminated relatively close to the peripheral edge of the ring 13 so that the grate may be located relatively close to one side edge of the top panel if desired. The fingers 13d of the opposed set, on the other hand, are extended substantially beyond the edge of the ring and into close proximity to the fingers 13b of the adjacent grate to form therewith a substantially continuous grid along which a utensil may slide freely from one burner to the other.

Three-point support for each of the grates 10 is afforded by bosses 14 integral with the undersides of the extreme outer end portions of three of the utensil-supporting fingers disposed at substantially equal intervals about the grate structure. In the present instance one of the bosses 14 (see Fig. 1) is formed on the underside of one of the fingers in the set 13d, while the other two bosses 14 are formed on the undersides of the fingers at the opposite sides of the sets 13a and 13c. These bosses are adapted to afford substantially point contact with the top of the sheet metal top panel 15 (see Fig. 2) for the stove. Such top panel may desirably have a porcelain finish and is provided with burner bowl depressions 15a therein, one for each of the four burner heads 16. The burner heads are located beneath the plane of the top panel 15 in the circular openings 15b in the centers of the burner bowl depressions in the latter so that the burner heads are, in effect, recessed in the top panel. The grate rings 13 are dimensioned to fit within the perimeters of their corresponding burner bowl depressions 15a with a small clearance and the bosses 14 support the same with the outer lower edges of the rings located substantially in the plane of the top panel. By using bosses, such as those shown, which have substantially a point contact with the top panel, and by locating the same at the outer ends of the utensil-supporting fingers remote from the burner, the conduction of heat from the grate to the top panel is minimized.

Correct angular positioning of the grates 10 to insure the accurate alignment of their adjacent fingers is afforded by a pair of integral lugs 17 located at diametrically opposite points on the underside of each of the rings 13. These locating lugs 17 are received within indentations 15c in the burner bowl depressions 15a. These indentations are deep enough so that the lower ends of the lugs have a clearance from the same, thus minimizing conduction of heat from the lugs and avoiding upsetting of the three-point support afforded by the bosses 14.

The grate rings 13 are used to confine and direct the flames issuing from the burner heads 16 to the bottom of a utensil resting on the grate fingers, and the rings have a special shape which not only facilitates such action but also minimizes heating of the same while so functioning. In their illustrative form the rings 13 have substantially the shape of a section of a shallow dome (see Fig. 2) and surround the corresponding burner heads in spaced relation thereto, being located substantially above the plane of the burner heads. The top or utensil seating surfaces of the grate fingers are, on the other hand, located in spaced relation above the upper edges of their grate rings 13 so that an annular space is defined between such upper edges of the grate rings and the bottom of a utensil resting on the fingers. A utensil is indicated in dot-dash outline at 18 in Fig. 2 and it will be seen that flames or gaseous products of combustion at F issuing from the burner head are compelled to pass upward and outward through the annular exit space at E between the upper edge of the grate ring 13 and the bottom of the utensil. In this way the hot gases are spread radially outward in a thin sheet along the bottom of the utensil, so that by this confinement they will effectually and efficiently heat the same. On the other hand, at least the upper edge portions of the rings 13 are made of fairly thin cross-section so as to minimize the heat absorptive capacity of the same, through minimization of the mass of metal presented at such edge to the hot gases that wash over it and therefore reduce the amount of heat conducted to the top panel. Moreover, by deflecting the gases toward the bottom of the utensil and away from the top panel, the supporting bosses are maintained at a lower temperature.

Although the hot gaseous products of combustion are effectively compelled by the grates 10 to flow in intimate contact with the bottoms of utensils supported on the grates, the construction of the grates is such as to minimize heat transfer to the top panel 15, thereby obviating crazing of the latter's finish or burning of a person touching it. From the preceding description it will be seen that this minimization of heat transfer is accomplished in two stages, namely, by the thin form of the top edges of the rings 13 presented to the hot gases, whereby a minimum of heat is absorbed by the rings, and, secondly, by supporting the grates by the point contact bosses 14 which are not only located at the remote ends, and therefore at the coolest parts of the grate fingers, but are protected by the interposed ring which tends to confine the hot gases to the utensil bottom away from the panel and the bosses 14 resting thereon.

From the foregoing it will be perceived that a cooking top structure has been provided which is pleasing in appearance, as well as simple and cheap to manufacture, but which nevertheless promotes efficient combustion while minimizing heat transfer to the top panel. Moreover, the grate arrangement disclosed constitutes a substantially continuous grid for the whole cooking top so that even large, soft-bottomed utensils may be effectually supported. The continuous character of the grid structure so presented obviates the possibility of sagging of the bottom of the utensil, any overhang of the same from the ends of the fingers of one grate being supported by the aligned fingers on the next adjacent grate as indicated with reference to the utensil 18 in Fig. 2. Such prevention of sagging of the utensil bottom is a matter of particular importance because of the likelihood of formation of toxic carbon monoxide due to incomplete combustion in the event that the sagging bottom of a utensil too greatly restricts the flow of the products of combustion from the burners. The grate arrangement herein disclosed is not only safe in that respect, but also makes it very easy to slide a utensil from one burner to another in the course of preparation of a meal.

I claim as my invention:

1. In a cooking top, a grate including a ring having a plurality of utensil-supporting fingers extending outwardly therefrom and presenting utensil seating surfaces in a plane spaced above the top of said ring, a top panel having an opening therein for the reception of a burner head located beneath the plane of the top panel, bosses on the outer end portions of a plurality of said fingers resting on said top panel in substantially point contact therewith for removably supporting said ring with its outer edge lying substantially in the plane of the top panel and the ring generally concentric with said opening in the panel, said ring having the shape of a section of a shallow dome and sloping upward and inward from its outer edge to a thin upper edge of low heat absorptive capacity for confining and directing the gaseous products of combustion from the burner for passage outward over such upper edge through the space between the latter and the bottom of a utensil rested on said seating surfaces.

2. In a cooking top for a gaseous fuel cookstove, in combination, a top panel formed with a depressed burner bowl having a central opening for a burner head, a grate structure for supporting utensils above said burner head opening comprising a ring dimensioned to fit over said burner bowl, a plurality of utensil supporting fingers rigid with said ring and projecting outwardly therefrom to overlie said top panel, depending bosses at the outer ends of certain of said fingers engageable with said top panel to support the grate structure with the outer peripheral edge of said ring substantially in the plane of said top panel, said ring sloping upwardly and inwardly to confine and direct the flame issuing from the burner head away from said top panel and against the bottom of a utensil seated on said supporting fingers, said fingers having their utensil supporting surfaces located in a plane substantially above the inner edge of said ring to provide clearance between the utensil and the ring for the escape of hot gases from the burner bowl.

HERBERT M. REEVES.

REFERENCES CITED

The following references are of record in the file of this patent:

UNITED STATES PATENTS

| Number | Name | Date |
|---|---|---|
| 2,019,381 | Antrim | Oct. 29, 1935 |
| D. 102,430 | Hoffstetter, et al. | Dec. 22, 1936 |
| 1,872,019 | Taylor | Aug. 16, 1932 |
| 2,180,645 | Sherman | Nov. 21, 1939 |
| 1,490,557 | Brennan | Apr. 15, 1924 |
| 1,079,767 | Jeavons | Nov. 25, 1913 |
| 1,942,265 | Teller, et al. | Jan. 2, 1934 |
| 2,361,916 | Althoff | Nov. 7, 1944 |
| 2,257,297 | Parker | Sept. 30, 1941 |
| 2,285,278 | Hennessy | June 2, 1942 |
| 2,005,242 | Rogers | June 18, 1935 |
| 2,257,395 | Parker | Sept. 30, 1941 |

FOREIGN PATENTS

| Number | Country | Date |
|---|---|---|
| 21,456 | Switzerland | Oct. 20, 1900 |